US011613307B2

(12) United States Patent
Yamashita

(10) Patent No.: US 11,613,307 B2
(45) Date of Patent: Mar. 28, 2023

(54) VEHICLE CONTACT AVOIDANCE ASSIST SYSTEM

(71) Applicant: HONDA MOTOR CO., LTD., Tokyo (JP)

(72) Inventor: Kazuo Yamashita, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 273 days.

(21) Appl. No.: 17/069,074

(22) Filed: Oct. 13, 2020

(65) Prior Publication Data
US 2021/0114660 A1 Apr. 22, 2021

(30) Foreign Application Priority Data
Oct. 16, 2019 (JP) .............................. JP2019-189341

(51) Int. Cl.
B62D 15/02 (2006.01)
G08G 1/16 (2006.01)
B62D 5/04 (2006.01)
B62D 1/06 (2006.01)

(52) U.S. Cl.
CPC ........... *B62D 15/0265* (2013.01); *B62D 1/06* (2013.01); *B62D 5/046* (2013.01); *B62D 15/021* (2013.01); *G08G 1/165* (2013.01); *G08G 1/166* (2013.01)

(58) Field of Classification Search
None
See application file for complete search history.

(56) References Cited

U.S. PATENT DOCUMENTS

| 10,377,366 | B2 * | 8/2019 | Otake | B60W 30/18109 |
|---|---|---|---|---|
| 2007/0233344 | A1 | 10/2007 | Satake | |
| 2008/0300788 | A1 * | 12/2008 | Kanaboshi | B62D 15/0265 701/301 |
| 2010/0121532 | A1 * | 5/2010 | Urai | B62D 15/0265 701/42 |
| 2017/0166237 | A1 * | 6/2017 | Oh | B62D 1/28 |
| 2019/0118849 | A1 * | 4/2019 | Cazzoli | B60R 21/0134 |

FOREIGN PATENT DOCUMENTS

| JP | 2007246025 A | 9/2007 |
|---|---|---|
| JP | 2007253640 A | 10/2007 |
| JP | 2008247328 A * | 10/2008 |
| JP | 2016200985 A | 12/2016 |

OTHER PUBLICATIONS

Notice of Reasons for Refusal for Patent Application JP 2019-189341 dated May 24, 2022; 10 pp.

* cited by examiner

Primary Examiner — Jeff A Burke
Assistant Examiner — Jerrod Irvin Davis
(74) Attorney, Agent, or Firm — Armstrong Teasdale LLP

(57) ABSTRACT

In a vehicle contact avoidance assist system (1) for providing assistance in avoiding an obstacle located ahead of a vehicle including a contact avoidance control unit (15) configured to perform an obstacle avoidance operation upon detecting an obstacle located ahead of the vehicle, the obstacle avoidance operation including a steering of the steerable wheel via the steering actuator so as to avoid the obstacle, the contact avoidance control unit is configured to apply a restriction on the obstacle avoidance operation depending on a detected gripping state detected by a steering wheel gripping state detection unit (8).

8 Claims, 5 Drawing Sheets

VEHICLE CONTACT AVOIDANCE ASSIST SYSTEM

TECHNICAL FIELD

The present invention relates to a vehicle contact avoidance assist system for providing assistance to a vehicle operator in avoiding an obstacle located ahead of or otherwise adjacent to an own vehicle.

BACKGROUND ART

As a vehicle operator turns the steering wheel of a motor vehicle, the load that is applied to the vehicle operator's hands may increase due to the changes in the angular positions of the vehicle operator's hands. This may adversely affect the driving comfort. JP2007-253640A discloses a steering device that alleviates this problem. This steering device includes a detecting means (such as a camera, a piezoelectric pressure sensor provided on the steering wheel and a steering angle sensor) that detects the positions of the vehicle operator's hands on the steering wheel, and a steering control unit controls the steering reaction applied to the steering wheel in such a manner that the steering reaction to be decreased with an increase in the steering angle and in dependence on the positions of the vehicle operator's hands on the steering wheel. This steering device may be either a steer-by-wire steering device or a power-assisted steering device.

In recent years, some proposals have been made for contact avoidance assist systems that allow the vehicle to automatically avoid a contact with an obstacle located ahead of the vehicle. In such a system, the control unit typically intervenes in the steering and braking operations of the vehicle. Therefore, when a contact avoidance assist operation is initiated, the steering wheel is turned without regard to the intension of the vehicle operator.

If the vehicle operator is gripping the steering wheel in a proper manner as taught in a driving school, the vehicle operator is able to cope with the sudden turning of the steering wheel which typically occurs at the initiation of the contact avoidance assist operation, and perform the subsequent steering operation that will be required to keep the vehicle under control. However, if the vehicle operator is not gripping the steering wheel in a proper manner at such a time, the vehicle operator's hand or hands may be strained in an undesired manner, and/or the contact avoidance assist operation may not be performed in an intended manner.

The steering device disclosed in JP2007-253640A does not provide an adequate remedy for this problem.

SUMMARY OF THE INVENTION

In view of such a problem of the prior art, a primary object of the present invention is to provide a vehicle contact avoidance assist system that can provide assistance to a vehicle operator in avoiding an obstacle located ahead of or otherwise adjacent to the vehicle without causing any undue strain to the vehicle operator's hand.

To achieve such an object, the present invention provides a vehicle contact avoidance assist system (1) for providing assistance in avoiding an obstacle located ahead of or otherwise adjacent to an own vehicle, comprising: a steering device (5) including a steering actuator (20) for steering a steerable wheel (18) of the vehicle according to a steering input applied to a steering wheel (21) of the vehicle; an obstacle acquisition unit (10) configured to acquire an obstacle located ahead of the vehicle; a contact avoidance control unit (15) configured to perform an obstacle avoidance operation upon detecting the obstacle located ahead of or otherwise adjacent to the vehicle by the obstacle acquisition unit, the obstacle avoidance operation including a steering of the steerable wheel via the steering actuator so as to avoid the obstacle; a steering wheel gripping state detection unit (8) configured to detect a gripping state of the steering wheel by a vehicle operator; wherein the contact avoidance control unit is configured to apply a restriction on the obstacle avoidance operation depending on the detected gripping state.

Thereby, the obstacle avoidance operation can be performed in such a manner that strain or load on the hands of the vehicle operator is prevented from becoming unduly great.

Preferably, the restriction includes limiting a steering torque of the steering actuator.

Thereby, even when the vehicle operator may be gripping the steering wheel in an improper manner, the hands of the vehicle operator are prevented from being unduly twisted with a high torque in the obstacle avoidance operation.

Preferably, the restriction includes limiting a steering angular speed of the steering actuator.

Thereby, the vehicle operator's hands are prevented from experiencing undue discomfort in the obstacle avoidance operation.

Preferably, the restriction includes limiting a steering angle of the steering actuator.

Thereby, even when the vehicle operator may be gripping the steering wheel in an improper manner, the hands of the vehicle operator are prevented from being twisted excessively in the obstacle avoidance operation.

Preferably, the gripping state includes a both-hands gripping state where the vehicle operator grips the steering wheel with both hands, and a one-hand gripping state where the vehicle operator grips the steering wheel with a single hand, the restriction applied by the contact avoidance control unit being of a higher level in the one-hand gripping state than in the both-hands gripping state.

When the vehicle operator is gripping the steering wheel with one hand, the hand may not be able to favorably accommodate the automatic turning of the steering wheel without losing the grip on the steering wheel and/or without experiencing some strain or discomfort. Therefore, it is advantageous to restrict the turning of the steering wheel in the obstacle avoidance operation in the case of the one-hand gripping state to a greater extent than in the case of the both-hands gripping state.

Preferably, the one-hand gripping state includes a left-hand gripping state where the vehicle operator grips the steering wheel only with a left hand, and a right-hand gripping state where the vehicle operator grips the steering wheel only with a right hand, the restriction applied by the contact avoidance control unit in the left-hand gripping state being of a higher level when the steering wheel turns in clockwise direction than when the steering wheel turns in counter-clockwise direction, the restriction applied by the contact avoidance control unit in the right-hand gripping state being of a higher level when the steering wheel turns in counter-clockwise direction than when the steering wheel turns in clockwise direction.

By thus increasing the restriction applied by the contact avoidance control unit in the turning of the steering wheel in the direction that causes a greater strain on the hand of the vehicle operator as compared to the case of the turning of the steering wheel in the direction that causes a lesser strain on the hand of the vehicle operator, the contact avoidance operation can be performed to a maximum extent without causing undue strain to the hand of the vehicle operator gripping the steering wheel.

Preferably, the gripping state includes a neither-hand gripping state where the vehicle operator grips the steering wheel neither hand, the restriction applied by the contact avoidance control unit being of a higher level in the one-hand gripping state and the two-hands gripping state than in the neither-hand gripping state.

When the vehicle operator is gripping the steering wheel with neither hand, the vehicle operator is unable to promptly take any action when an obstacle is present ahead of the vehicle. It is therefore highly essential in such case that the obstacle avoidance operation be performed with a minimum restriction. (When the restriction is in the form of a limit value imposed on the steering angle and other operation amount values, a lower restriction corresponds to a higher limit value.) Therefore, by arranging such that the restriction applied by the contact avoidance control unit is of a higher level in the one-hand gripping state and the two-hands gripping state than in the neither-hand gripping state, the contact avoidance control unit is allowed to execute the contact avoidance control in an optimum fashion without the risk of straining the hand or the hands of the vehicle operator.

Preferably, the contact avoidance control unit is configured to transmit a signal to the vehicle operator via the steering wheel when the single-hand gripping state is detected immediately before the obstacle avoidance operation is initiated and/or during execution of the obstacle avoidance operation.

Thereby, the vehicle operator is encouraged to take an action required to avoid the obstacle in a timely fashion while being aided by the contact avoidance control unit. Such a signal may also be transmitted to the vehicle operator visually, tactilely and/or audibly in addition to or instead of the movement of the steering wheel.

Preferably, the signal to be transmitted to the vehicle operator comprises a cyclic angular movement of the steering wheel.

Thereby, the vehicle operator is induced to apply an appropriate steering input to the steering wheel in an intuitive manner.

Preferably, the cyclic angular movement of the steering wheel is performed in such a manner that an angular speed of the steering wheel in a direction of a movement of the steerable wheel in avoiding the obstacle is greater than an angular speed of the steering wheel in an opposite direction.

By thus suggesting the turning direction of the steering wheel that is required in avoiding the obstacle via such a movement of the steering wheel, the vehicle operator is induced to apply an appropriate steering input to the steering wheel in the correct direction in an intuitive manner.

The present invention thus provides a vehicle contact avoidance assist system that can provide assistance to a vehicle operator in avoiding an obstacle located ahead of or otherwise adjacent to the vehicle without causing any undue strain to the vehicle operator's hand.

DESCRIPTION OF THE PREFERRED EMBODIMENT(S)

A vehicle contact avoidance assist system according to an embodiment of the present invention is described in the following with reference to the appended drawings.

Figure 1:
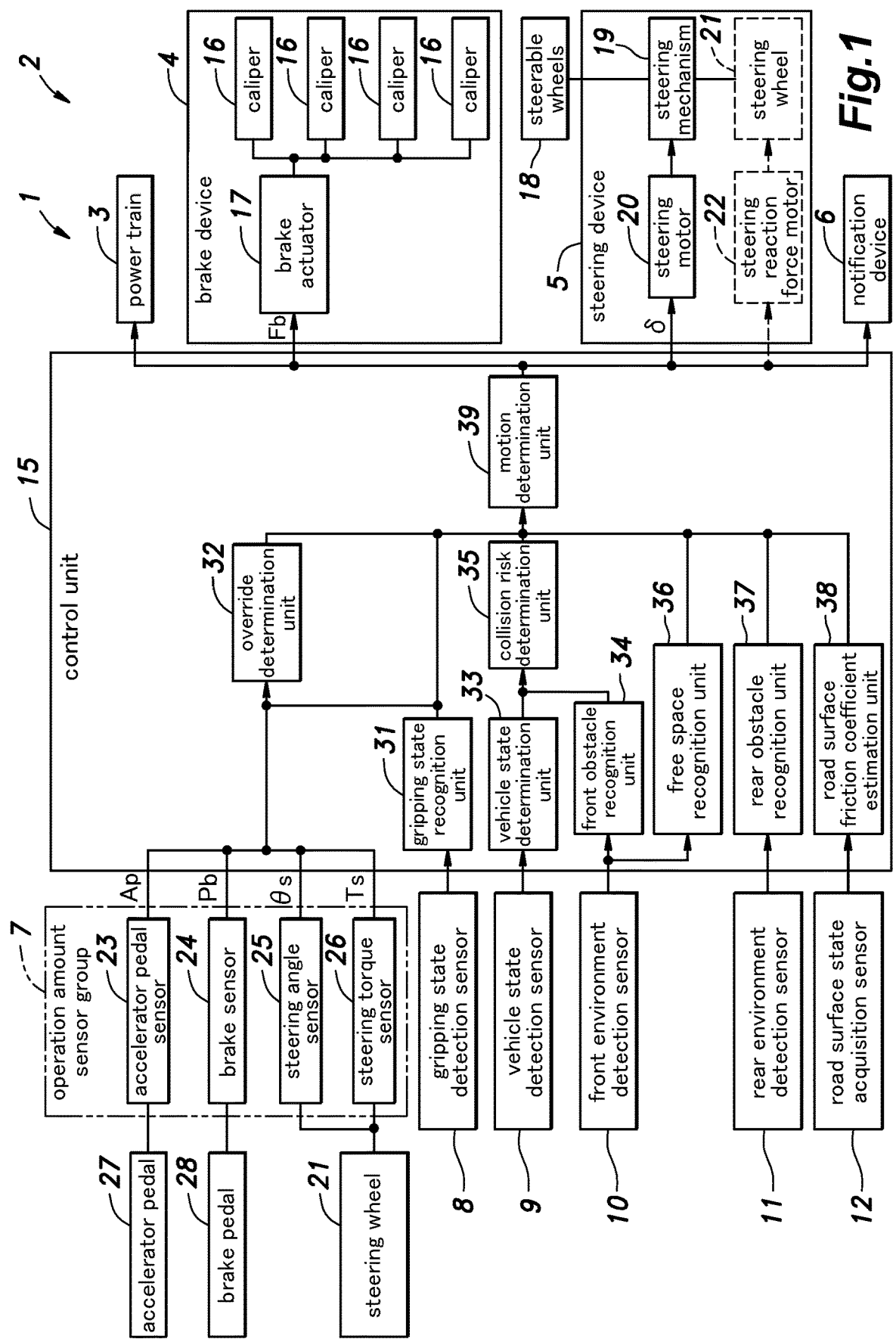
FIG. 1 is a block diagram of a vehicle equipped with a vehicle contact avoidance assist system according to an embodiment of the present invention.

FIG. 1 is a block diagram of a vehicle 2 equipped with the vehicle contact avoidance assist system 1 of the present invention. The contact avoidance assist system 1 is configured to control the movement of the vehicle so as to avoid a contact with an obstacle which may be located in front of the vehicle 2. The vehicle 2 in this case consists of a four-wheeled vehicle, and includes a power train 3, a brake device 4, a steering device 5, a notification device 6, an operation amount sensor group 7, a gripping state detection sensor 8, a vehicle state detection sensor 9, a front environment detection sensor 10, and a rear environment detection sensor 11, a road surface state acquisition sensor 12, and a control unit 15. These system components of the vehicle 2 are connected to each other via a communication means such as CAN (Controller Area Network) so that signals can be transmitted among them.

The power train 3 provides the propelling force to the vehicle 2, and includes, for example, a power source and a transmission unit. The power source may include at least one of an internal combustion engine such as a gasoline engine or a diesel engine and an electric motor. The power train 3 includes a per se known propelling force distribution device that distributes the generated propelling force to the left and right wheels. The brake device 4 is configured to apply a braking force Fb to the vehicle 2, and includes, for example, four calipers 16 (brake calipers) that are each configured to press a pad against a brake rotor provided on the corresponding wheel, and a brake actuator 17 fitted with an electrically actuated cylinder that supplies hydraulic pressure to the calipers 16. The brake actuator 17 may include a per se known braking force distribution device (such as a VSA hydraulic unit) that distributes the braking force Fb generated in the brake device 4 to the four calipers 16. The brake device 4 may include a parking brake device that restricts rotation of the wheels when the vehicle 2 is stationary in a per se known manner.

The steering device 5 is a device for changing a steering angle δ, which is a turning amount of the steerable wheels 18 (front wheels), and includes, for example, a steering mechanism 19 primarily consisting of a rack and pinion mechanism for turning the steerable wheels 18, and a steering motor 20 that actuates the steering mechanism 19. The steering device 5 may be an electric power steering system in which the steering wheel 21 and the steering mechanism 19 are mechanically connected to each other, and the steering motor 20 provides a steering assist torque. Alternatively, the steering device 5 may be a steer-by-wire steering device in which the steering mechanism 19 and the steering wheel 21 are normally mechanically uncoupled from each other. In the case of a steer-by-wire steering device, the steering device 5 further includes a steering reaction force motor 22 that applies a steering reaction force to the steering wheel 21. The steerable wheels 18 (typically consisting of front wheels) are steered by the steering motor 20 via the steering mechanism 19 in response to the turning of the steering wheel 21, and a steering reaction force created by the steering reaction force motor 22 so as to correspond to the steered state of the steerable wheels 18 is applied to the steering wheel 21. The steering wheel 21 is a steering input member that receives a steering input applied thereto by the vehicle operator.

The notification device 6 is a device for notifying the vehicle operator of information about driving and vehicle conditions by light, sound, and/or vibration. For example, the notification device may include a display device, a sound emitter provided on an instrument panel, and a vibration device provided on the steering wheel 21 or the seat. The vibration device that vibrates the steering wheel 21 may consist of the steering motor 20 or the steering reaction force motor 22 which is suitably actuated by the control unit 15. The power train 3, the brake device 4, the steering device 5, and the notification device 6 are controlled by the control unit 15.

The operation amount sensor group 7 is a group of sensors for detecting various operation amounts or the amounts of various operations performed by the vehicle operator, and may include an accelerator pedal sensor 23, a brake sensor 24, a steering angle sensor 25, and a steering torque sensor 26. The accelerator pedal sensor 23 detects an accelerator pedal depression amount Ap (accelerator opening degree) or a driving operation amount performed by the vehicle operator with respect to the accelerator pedal 27. The accelerator pedal 27 is a driving operation member that receives a driving operation performed by the vehicle operator in regard to the power train 3. The brake sensor 24 is a braking operation amount detection sensor that detects the brake pedal force Pb or the amount of braking operation performed by the vehicle operator on the brake pedal 28, and can be detected from the brake fluid pressure. The brake pedal 28 is a braking operation member that receives a braking operation performed by the vehicle operator on the brake device 4. The steering angle sensor 25 detects a steering angle θs or the steering angle of the steering wheel 21. The steering torque sensor 26 detects the steering torque Ts applied to the steering wheel 21.

The gripping state detection sensor 8 is a sensor for detecting the gripping state of the vehicle operator with respect to the steering wheel 21, and, for example, may consist of a camera provided in front of the vehicle operator in the vehicle interior to detect the position and angle of the vehicle operator's hands gripping the steering wheel 21. The gripping state detection sensor 8 may, alternatively or additionally, include a piezoelectric sensor provided on the steering wheel 21 to detect the pressure applied thereto by the hands of the vehicle operator. Typically, a plurality of piezoelectric sensor elements are arranged along the circumference of the steering wheel 21 so that the position or the positions at which the vehicle operator is gripping the steering wheel 21 may be detected.

The vehicle state detection sensor 9 includes a vehicle speed sensor that detects the speed of the vehicle 2 and a yaw rate sensor that detects the angular velocity of the vehicle 2 around the vertical axis. The yaw rate sensor may consist of a gyro sensor. The vehicle state detection sensor 9 may further include an acceleration sensor that detects the fore and aft acceleration of the vehicle 2, a direction sensor that detects the heading direction of the vehicle 2, and other sensors.

The front environment detection sensor 10 is a relative position acquisition sensor that detects an object such as an obstacle in front of the vehicle 2, and acquires the relative position between the vehicle 2 and the obstacle. The rear environment detection sensor 11 is a device that detects an object such as an obstacle on the rear side of the vehicle 2, and acquires a relative position between the vehicle 2 and the obstacle. The front environment detection sensor 10 and the rear environment detection sensor 11 may consist of sensors such as radars, lidars and cameras that capture the electromagnetic wave or the light from external objects. These sensors may be configured to emit signals therefrom, and receive the signals reflected from the external objects. Alternatively, these sensors may be configured to detect external objects from the signals transmitted from roadside sensors.

The radar emits radio waves such as millimeter waves in prescribed directions from the vehicle 2 and captures the reflected waves to acquire the position (distance and direction) of an object. At least one radar may be fitted to a selected position of the vehicle 2. Preferably, the front environment detection sensor 10 includes a front radar that irradiates radio wave in the forward direction, and the rear environment detection sensor 11 includes a rear radar that irradiates radio wave in the rearward direction. More preferably, the rear environment detection sensor 11 includes a pair of radars that emit radio waves in either lateral direction.

The lidar irradiates light such as infrared rays in prescribed directions from the vehicle 2, and captures the reflected light to acquire the position (distance and direction) of the object. At least one lidar may be provided at a selected location on the vehicle 2. Preferably, the front environment detection sensor 10 includes a front lidar that emits light in the forward direction, and the rear environment detection sensor 11 includes a rear lidar that emits light in the rearward direction. More preferably, the rear environment detection sensor 11 includes a pair of side lidars that emit light in either lateral direction.

The external cameras are configured to capture the images of an area surrounding the vehicle 2 so as to capture the images of the surrounding objects such as vehicles, pedestrians, guardrails, curbs, walls, medians, road signs, road shapes and road markings drawn on the road. The external cameras may consist of digital cameras using solid-state image sensors such as CCD and CMOS. At least one camera may be provided at a selected position on an exterior of the vehicle 2. Preferably, the front environment detection sensor 10 includes a front camera that captures the forward view of the vehicle 2, and the rear environment detection sensor 11 includes a rear camera that captures the rearward view of the vehicle 2. More preferably, the rear environment detection sensor 11 includes a pair of side cameras that capture the lateral views as seen from the vehicle 2. The external cameras may include a stereoscopic camera.

The road surface state acquisition sensor 12 is a sensor for acquiring the condition of the road surface on which the vehicle 2 travels. The road surface state acquisition sensor 12 includes, for example, a wheel rotational speed sensor provided for each wheel to estimate the road surface friction coefficient μ. The operation amount sensor group 7, the gripping state detection sensor 8, the vehicle state detection sensor 9, the front environment detection sensor 10, the rear environment detection sensor 11, and the road surface state acquisition sensor 12 forward the detection/acquisition results to the control unit 15.

The control unit 15 includes an arithmetic processing unit (CPU) and a storage device (memory such as ROM and RAM), and essentially consists of an electronic control unit (ECU) or a computer configured to execute various processes necessary for the contact avoidance assist operation according to a computer program stored in the storage device (memory). The control unit 15 may be configured as a single piece of hardware or a plurality of pieces of hardware arranged in various parts of the vehicle.

The control unit 15 includes a plurality of functional units which may be realized by the operation of the electronic control unit 15, and the functional units may be realized exclusively by software or by using specially designed hardware such as LSI, ASIC and FPGA. Such functional units may include a gripping state recognition unit 31, an override determination unit 32, a vehicle state determination unit 33, a front obstacle recognition unit 34, a collision risk determination unit 35, a free space recognition unit 36, a rear obstacle recognition unit 37, a road surface friction coefficient estimation unit 38, and a motion determination unit 39.

The gripping state recognition unit 31 recognizes the vehicle operator's gripping state based on the detection result (gripping state) of the gripping state detection sensor 8. More specifically, the gripping state recognition unit 31 is configured to distinguish a both-hands gripping state in which the vehicle operator grips the steering wheel 21 with both hands, a one-hand gripping state in which the vehicle operator grips the steering wheel 21 with one hand, and a neither-hand gripping state in which the vehicle operator grips the steering wheel 21 with neither hand.

Even when the vehicle operator grips the steering wheel with both hands, if at least either one of the hands is not gripping the steering wheel firmly enough (such as when the steering wheel is gripped only by fingers), the gripping state may not be considered as the both-hands gripping state, but as either the one-hand gripping state or the neither-hand gripping state. Also, if at least either one of the hands is gripping the steering wheel at an improper position (such as six-o'clock position or twelve-o'clock position), the gripping state again may not be considered as the both-hands gripping state, but as either the one-hand gripping state or the neither-hand gripping state. The both-hands gripping state is considered as a proper gripping state, and all the other gripping states are considered as improper gripping states.

When the one-hand gripping state is detected, the gripping state recognition unit 31 further determines with which hand the vehicle operator is gripping the steering wheel 21. When the steering wheel 21 is turned in a certain direction as a result of an initiation of an obstacle avoidance operation and the one-hand gripping state is detected, the strain on the hand of the vehicle operator gripping the steering wheel 21 differs depending on if the vehicle operator is gripping the steering wheel with the left hand or the right hand. Suppose that the steering wheel 21 is turned in clockwise direction upon initiation of an obstacle avoidance operation. If the vehicle operator is gripping the steering wheel 21 with the left hand, the left hand of the vehicle operator can follow the turning movement of the steering wheel without losing the grip or suffering from undue strain. However, if the vehicle operator is gripping the steering wheel 21 with the right hand, the right hand of the vehicle operator will experience some difficulty in following the turning movement of the steering wheel without losing the grip or suffering from undue strain due to the structure of the shoulder joint. Thus, when the vehicle operator is gripping the steering wheel 21 with one hand, depending on which hand the vehicle operator is gripping the steering wheel 21, there is a comfortable steering direction and an uncomfortable steering direction. If the obstacle avoidance operation requires a movement of the steering wheel 21 in the uncomfortable direction, there will be a need to prevent any undue strain on the hand or the shoulder of the vehicle operator.

The override determination unit 32 determines the presence or absence of human intervention (override) during the execution of the contact avoidance assistance control by the control unit 15 according to the accelerator pedal depression amount Ap, the brake pedal force Pb, the steering angle $\theta s$, the steering angular velocity, and/or the steering gripping state. The override determination unit 32 distinguishes the different modes of human intervention which may include an accelerator override, a brake override, and a steering override.

The vehicle state determination unit 33 determines (estimates) the predicted traveling path of the own vehicle based on the vehicle speed, the yaw rate, and the like. The front obstacle recognition unit 34 recognizes a front obstacle according to the detection/acquisition result of the front environment detection sensor 10, and at the same time, determines the attributes (vehicle, pedestrian, structure, etc.), the relative position (distance and direction from the own vehicle), and the relative speed of the detected front obstacle. Such information may be referred to as front obstacle information in the following disclosure. The collision risk determination unit 35 determines or evaluates the risk of the own vehicle colliding with the obstacle according to the predicted traveling path of the vehicle determined by the vehicle state determination unit 33 and the front obstacle information acquired by the front obstacle recognition unit 34. More specifically, the collision risk determination unit 35 determines the risk of colliding with an obstacle detected ahead of the vehicle, a direction in which the collision is predicted to occur, a TTC (Time To Collision), a lap factor (a value obtained by dividing the amount of overlap of the own vehicle with the front obstacle by the width of the own vehicle) and the like.

The free space recognition unit 36 recognizes a white line (a road marking) on the road surface ahead of the vehicle, an oncoming vehicle, a roadside structure, a pedestrian, a road shoulder, and the like according to the detection/acquisition result of the front environment detection sensor 10. The free space recognition unit 36 can further recognize or define a free space that the own vehicle can safely occupy according to the detection/acquisition result of the front environment detection sensor 10. The rear obstacle recognition unit 37 recognizes an adjacent lane, objects located to the rear and laterally adjacent to the own vehicle, roadside structures, and the like according to the detection/acquisition result of the rear environment detection sensor 11. In addition, the rear obstacle recognition unit 37 determines the attributes (vehicle, pedestrian, structure, etc.), the relative position (distance and direction from the own vehicle), and the relative speed of each object detected to the rear of the own vehicle or laterally adjacent to the own vehicle. Such information may be referred to as rear and lateral obstacle information in the following disclosure.

The road surface friction coefficient estimation unit 38 estimates the road surface friction coefficient $\mu$ according to the acquisition result of the road surface state acquisition sensor 12. For example, the road surface friction coefficient estimation unit 38 may estimate the road friction coefficient μ by operating the brake actuator 17 to generate the braking force Fb on the rear wheels, and measuring the difference between the rotational speeds of the front wheels and the rear wheels. The road surface friction coefficient estimation unit 38 may estimate the road surface friction coefficient μ by using any other per se known method without departing from the spirt of the present invention.

The motion determination unit 39 controls the operations of the power train 3, the brake device 4, the steering device 5, and the notification device 6 so as to provide an assistance in avoiding the obstacle believed to be located in front of the vehicle according to the detection result (gripping state) of the gripping state recognition unit 31, the determination result (override) of the override determination unit 32, and determination result (collision risk) of the collision risk determination unit 35, the identification result (free space information) of the free space recognition unit 36, the identification result (regarding the obstacle in the rear of the vehicle) of the rear obstacle recognition unit 37, and the estimation result (road surface friction coefficient μ) of the road surface friction coefficient estimation unit 38.

More specifically, the motion determination unit 39 determines if the driving operation assistance for contact avoidance is necessary by evaluating the risk of collision with the obstacle detected in front of the vehicle according to various pieces of information such as the relative position of the front obstacle, and if the driving operation assistance is determined to be necessary, forwards command signals obtained by executing the prescribed computing processes to the power train 3, the brake device 4, the steering device 5, and the notification device 6 so as to avoid contact with the obstacle located ahead of the vehicle.

Figure 2:
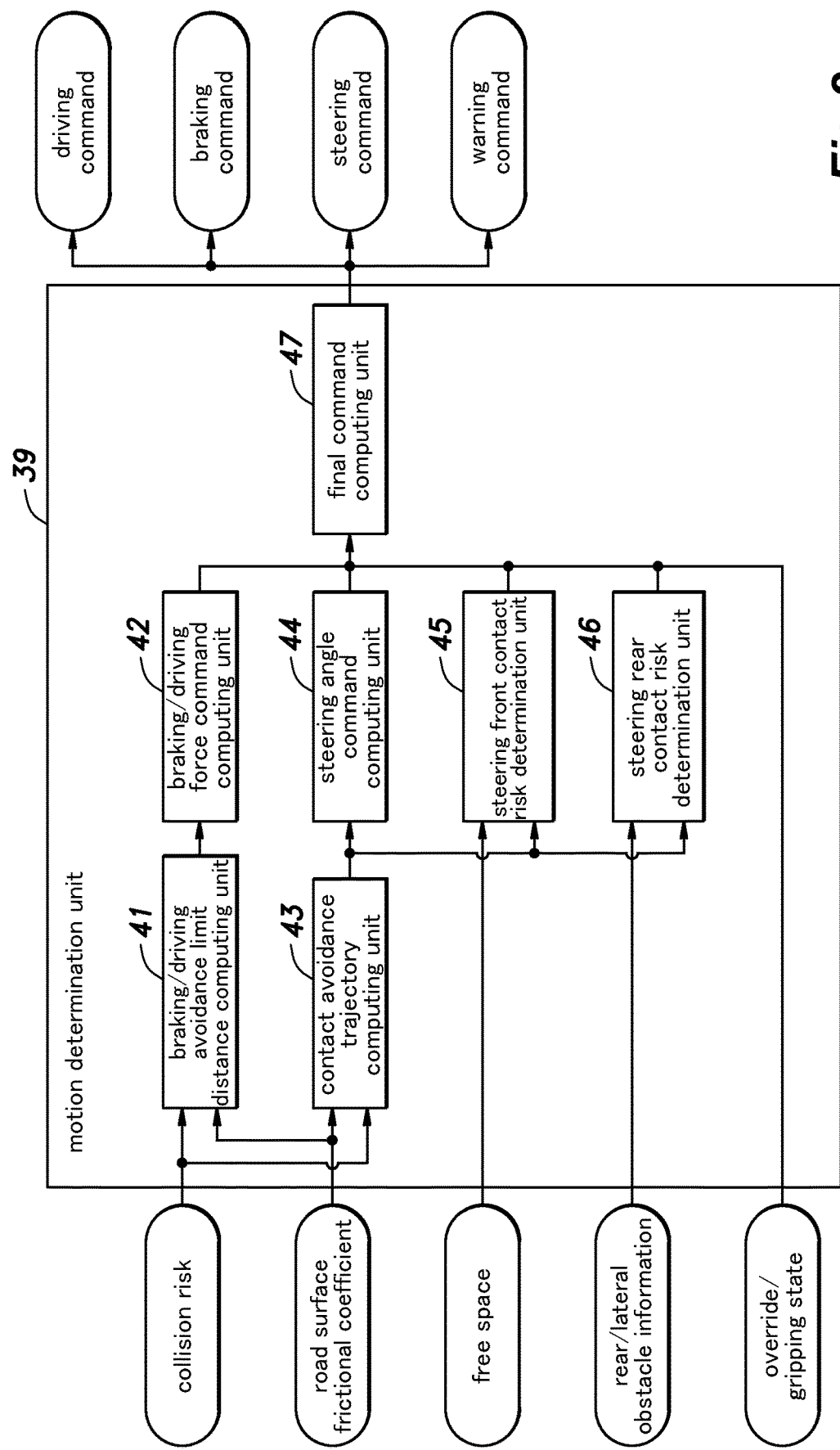
FIG. 2 is a block diagram of a motion determination unit of the vehicle contact avoidance assist system.

FIG. 2 is a block diagram of the motion determination unit 39 shown in FIG. 1. As shown in FIG. 2, the motion determination unit 39 includes a braking avoidance limit distance computing unit 41, a braking force command computing unit 42, a contact avoidance trajectory computing unit 43, a steering angle command computing unit 44, a steering front contact risk determination unit 45, a steering rear contact risk determination unit 46, and a final command computing unit 47.

The braking avoidance limit distance computing unit 41 computes a braking avoidance limit distance which is a relative distance required for the vehicle 2 to avoid a contact with the front obstacle by braking according to the collision risk and the road surface friction coefficient μ. The braking force command computing unit 42 computes the command value of the braking force Fb that is to be generated by the brake device 4 according to the required deceleration computed from the braking avoidance limit distance and the vehicle speed, and the braking force Fb obtained by multiplying the computed deceleration by the mass of the vehicle 2.

The contact avoidance trajectory computing unit 43 computes a contact avoidance trajectory that should be taken for the vehicle 2 to avoid a contact with a front obstacle by a steering operation of the vehicle 2 according to the collision risk and the road surface friction coefficient μ. The steering angle command computing unit 44 computes a command value of the steering angle δ required for the vehicle 2 to trace or follow a contact avoidance trajectory.

The steering front contact risk determination unit 45 computes the risk of colliding with the front obstacle when avoiding a contact with the front obstacle by steering according to the contact avoidance trajectory computed by the contact avoidance trajectory computing unit 43 and the free space information. The steering rear contact risk determination unit 46 computes the risk of colliding with the rear obstacle or the lateral obstacle when avoiding a contact with the obstacle by steering according to the contact avoidance trajectory computed by the contact avoidance trajectory computing unit 43 and the free space information.

The final command computing unit 47 determines a need for a driving operation assistance in order to avoid a contact with the front obstacle according to the command value of the driving force for avoiding a contact by a driving (propelling) operation, the command value of the braking force Fb for avoiding a contact by a braking operation, the command value for the steering angle δ for avoiding a contact by a steering operation, the contact risk in avoiding a contact with the front obstacle by steering, and the contact risk in avoiding a contact with the rear obstacle by steering. When it is determined that a driving operation assistance is necessary, the final command computing unit 47 selects the control action that is to be taken, and executes the corresponding control operations such as computing the final command values for the power train 3, the brake device 4, the steering device 5, and the notification device 6, and forwarding the command signals (drive command signal, braking command signal, steering command signal, warning command signal, etc.) to the corresponding functional parts of the vehicle 2.

More specifically, the final command computing unit 47 executes a driving force distribution control for distributing the driving force generated by the power train 3 to the left and right wheels via the driving force distribution device of the power train 3. The final command computing unit 47 executes a braking force control that causes the brake actuator 17 of the brake device 4 to generate a predetermined braking force Fb regardless of the brake pedal force Pb of the brake pedal 28. Further, the final command computing unit 47 executes the braking force distribution control to distribute the predetermined braking force Fb generated in the brake actuator 17 to the caliper 16 provided on each wheel via the braking force distribution device of the brake actuator 17. Hereinafter, the driving force distribution control and the braking force distribution control will be collectively referred to as the braking/driving force distribution control. The final command computing unit 47 executes the steering angle control so as to realize the predetermined steering angle δ regardless of the steering angle θs via the steering motor 20 of the steering device 5. The final command computing unit 47 further executes a notification control that causes the notification device 6 to notify the vehicle operator or issue a warning.

Figure 3:
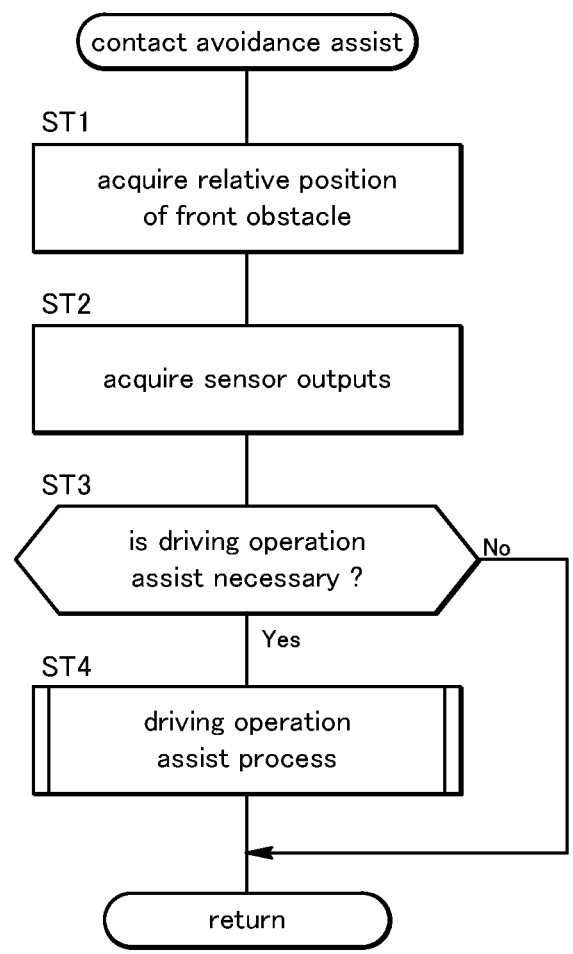
FIG. 3 is a flowchart of a vehicle contact avoidance assist process which is executed by a control unit of the vehicle contact avoidance assist system.

Next, the process of the contact avoidance assist operation provided by the control unit 15 configured as described above is described in the following. FIG. 3 is a flowchart of the contact avoidance assist process executed by the control unit 15 shown in FIG. 1. The control unit 15 repeats the contact avoidance assist process shown in FIG. 3 at a predetermined control cycle. As shown in FIG. 3, in the contact avoidance assist process, the control unit 15 performs the relative position acquisition process to thereby acquire the relative position between the vehicle 2 and the front obstacle according to the detection/acquisition result of the front environment detection sensor 10 (step ST1). In addition, the control unit 15 performs a sensor value acquisition process to thereby acquire detection/acquisition values of various sensors such as the operation amount sensor group 7, the gripping state detection sensor 8, the vehicle state detection sensor 9, the rear environment detection sensor 11, and the road surface state acquisition sensor 12 (step ST2).

Subsequently, the control unit 15 performs a necessity determination process for determining if a driving operation assist for contact avoidance is necessary according to at least a collision risk with a front obstacle according to the relative position of the front obstacle. (Step ST3). When it is determined in step ST3 that the driving operation assist is unnecessary, the control unit 15 concludes this routine, and restarts this routine. On the other hand, when it is determined in step ST3 that the driving operation assist is necessary, the control unit 15 executes a driving operation assist process (step ST4).

Figure 4:
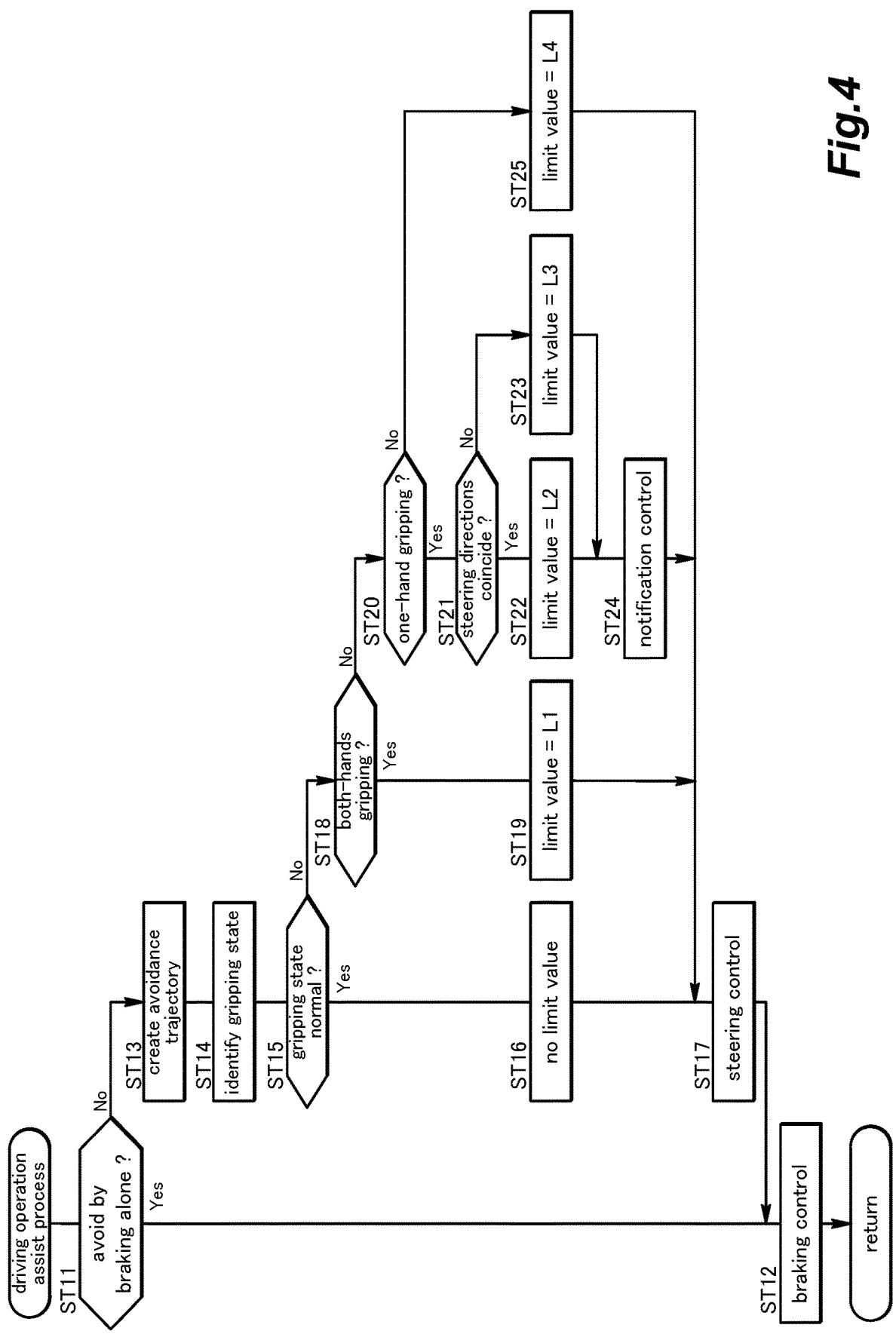
FIG. 4 is a flowchart of a driving assist process shown in FIG. 3.

FIG. 4 is a flowchart of the driving operation assist process shown in FIG. 3. The control unit 15 repeats the driving operation assist process shown in FIG. 4 at a predetermined control cycle. As shown in FIG. 4, in the driving operation assist process, the control unit 15 determines if the contact with the front obstacle can be avoided by the braking operation alone (step ST11). More specifically, the control unit 15 determines, according to the front obstacle information including the relative position, if it is possible to avoid the contact with the front obstacle only by the braking operation. When it is determined that the contact avoidance is possible by the braking operation alone (ST11: Yes), the control unit 15 performs the braking control whereby the braking force Fb to be generated in the brake device 4 (for example, the maximum braking force according to the road surface friction coefficient μ) is produced as a command signal (step ST12). The control cycle is then concluded, and a new control cycle is started once again. When it is determined that the contact cannot be avoided only by the braking operation (ST11: No), the control unit 15 computes the contact avoidance trajectory that should be taken by the steering operation to avoid the contact (step ST13).

Subsequently, the control unit 15 causes the gripping state recognition unit 31 to recognize the gripping state of the vehicle operator with respect to the steering wheel 21 (step ST14). More specifically, the control unit 15 identifies one of the both-hands gripping state, the one-hand gripping state, and the neither-hand gripping state. The control unit 15 may also identify if the vehicle operator's gripping state is a normal gripping state or an abnormal gripping state. Further, when the control unit 15 recognizes the one-hand gripping state, the gripping state recognition unit 31 distinguishes if the vehicle operator's hand gripping the steering wheel 21 is the right hand or the left hand to determine the direction of turning the steering wheel that causes relatively small strain on the hand of the vehicle operator holding the steering wheel 21.

Thereafter, the control unit 15 determines if the vehicle operator's gripping state is a normal gripping state (step ST15), and when it is determined to be a normal gripping state in step ST15 (Yes), no limit value is set in the steering control (step ST16). In other words, the control unit 15 selects a normal mode in which no limit value is set in the steering control. Then, the control unit 15 executes the steering control in the normal mode with no limit value (step ST17), and the program flow advances to the processing to step ST12 before restarting the control process anew.

The limit value is the limit value (upper limit value) of the steering torque in the steering control in the present embodiment. The control unit 15 sets the steering angle δ required to drive the vehicle 2 along the contact avoidance trajectory computed in step ST13 as a target value, and controls the current flowing through the steering motor 20 by PID control, for example. In the normal mode, practically, there is no limit on the value of the current flowing through the steering motor 20. Therefore, the control unit 15 causes the steering motor 20 to have the rated current as the maximum value, and at this time, the steering motor 20 outputs the rated torque.

When it is determined in step ST15 that the gripping state is abnormal (No), the control unit 15 subsequently determines if the gripping state of the vehicle operator is the both-hands gripping state (step ST18). When it is determined in step ST18 that both hands are gripping the steering wheel (Yes), the control unit 15 sets the first limit value L1 as the limit value in the steering control (step ST19). In other words, the control unit 15 selects a limit mode in which the limit value is set for the steering control. The first limit value L1 is an upper limit value of the steering torque that is a value less than the rated current. In other words, the lower the limit value is, the more restrictive the steering torque is. Then, the control unit 15 executes the steering control in the limit mode involving the first limit value L1 (step ST17), and the program flow advances to the processing of step ST12 before restarting the control process anew.

Thus, even in the both-hands gripping state, if an abnormal gripping state is recognized (ST15: No), the control process is performed with the limit value (L1) set in the steering control. Thereby, also in the case of the abnormal gripping state, the vehicle operator's hands are protected from undue strain while the steering control is executed so as to avoid an obstacle.

When it is determined in step ST18 that the vehicle operator is not in the both-hands gripping state (No), the control unit 15 then determines if the vehicle operator's griping state is the one-hand gripping state (step ST20). When the one-hand gripping state is determined in step ST20 (Yes), the control unit 15 then determines if the steering direction in the steering control corresponds to the direction which does not cause any undue strain to the hand that is gripping the steering wheel (step ST21). If the steering direction in the steering control indeed corresponds to the direction which does not cause any undue strain to the hand in step ST21 (Yes), or if the steering direction coincides with the comfortable steering direction in step ST21 (Yes), the control unit 15 sets a second limit value L2 as the limit value in the steering control (step ST22). In other words, the control unit 15 selects the limit mode involving the second limit value L2. The second limit value L2 is a value smaller than the first limit value L1 (L2<L1) so that the steering torque of the contact avoidance operation is made more restrictive. On the other hand, when the two directions does not coincide with each other or when the steering direction in the steering control corresponds to the direction (uncomfortable steering direction) which causes an undue strain to the hand that is gripping the steering wheel 21 in step ST21 (No), the control unit 15 sets the third limit value L3 as the limit value in the steering control (step ST23). In other words, the control unit 15 selects the limit mode involving the third limit value L3. The third limit value L3 is a value smaller than the second limit value L2 (L3<L2) so that the steering torque of the contact avoidance operation is made even more restrictive.

Following step ST22 or step ST23, the control unit 15 executes a notification control (step ST24). More specifically, the control unit 15 controls the notification device 6 so as to solicit the vehicle operator by light or sound to properly grip the steering wheel 21. Further, the control unit 15 executes the notification control for the steering device 5 so as to solicit the vehicle operator to grip the steering wheel 21 via the steering wheel 21. More specifically, the control unit 15 generate a control signal for controlling the steering motor 20 so as to cyclically or vibratorily move the steering wheel 21 via the steering mechanism 19 in clockwise and counter-clockwise directions with a predetermined amplitude. The predetermined amplitude may be, for example, a small amplitude such that the steerable wheels 18 are not substantially steered.

Figure 5A:
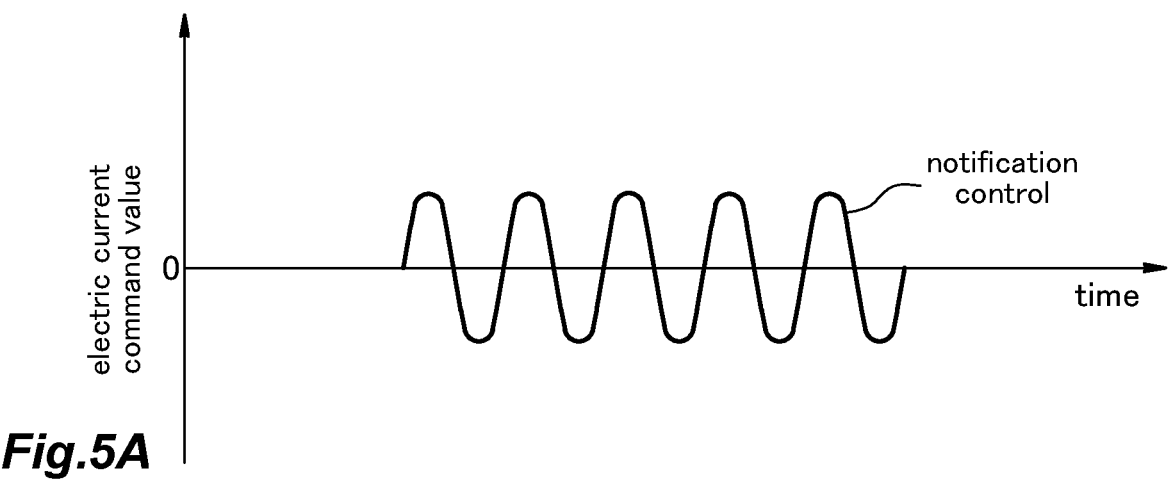
FIG. 5A is one time chart of electric current supplied to a steering motor.
Figure 5B:
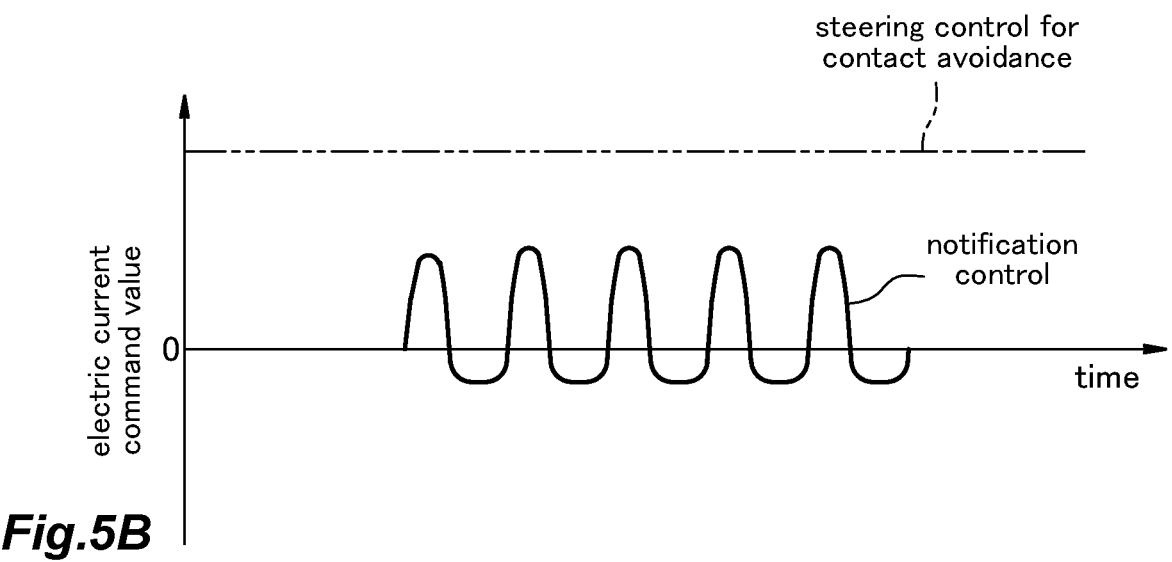
FIG. 5B is another time chart of electric current supplied to the steering motor.

The control signal of the notification control for the steering motor 20 may consist of a substantially sine-wave or sawtooth electric current command signal to be added to or superimposed on the current value of the steering control as shown in FIG. 5A. In this case, the current value for the cyclic electric current command signal is symmetric or has a same magnitude in both the positive and negative directions. Alternatively, the control unit 15 may set the steering speed in such a manner that the current value for the cyclic current command signal in the steering direction of the current steering direction is greater than that in the opposite direction as shown in FIG. 5B. In other words, the angular speed (steering torque) of the cyclical steering movement in the steering direction of the current steering direction (for obstacle avoidance operation) is greater than the angular speed (steering torque) of the cyclical steering movement contrary to the steering direction of the current steering direction.

Figure 5C:
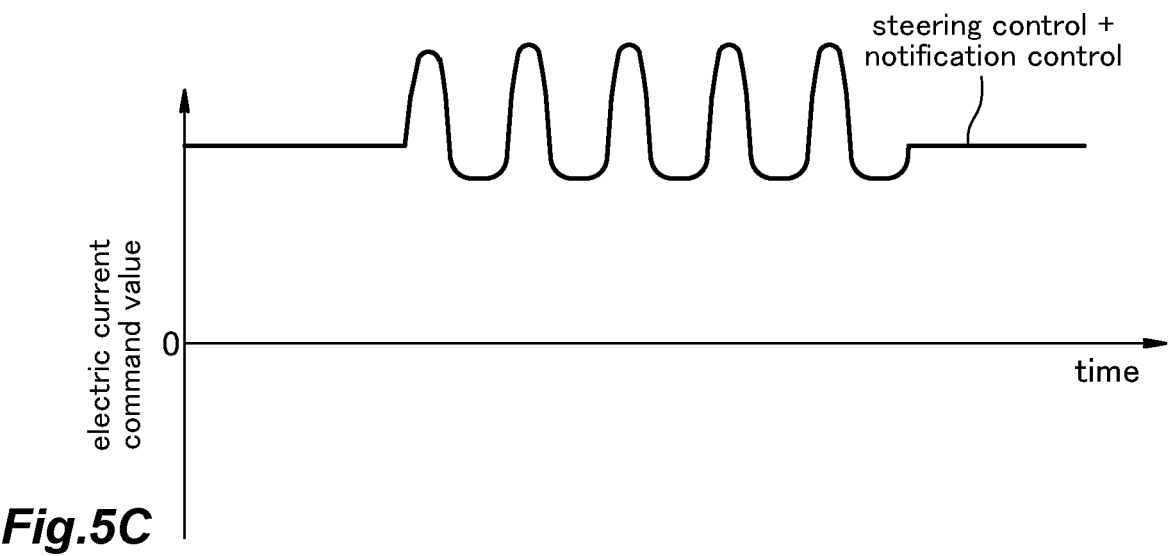
FIG. 5C is yet another time chart of electric current supplied to the steering motor.

Subsequently, the control unit 15 executes the steering control in the limit mode involving the second limit value L2 or the third limit value L3 (step ST17), and advances to the processing to step ST12 before restarting the control process anew. The electric current command signal of the notification control for the steering device 5 is added to or is superimposed on the electric current command signal of the steering control in the limit mode, as shown in FIG. 5C. In other words, the notification control for the steering device 5 is executed in addition to the steering control for the obstacle avoidance operation.

In this way, when the one-hand gripping state is detected (ST20: Yes), the control unit 15 executes the steering control in step ST17 by setting the limit value of the limit mode to a smaller value (limit value=L2, L3<L1) than when the both-hands gripping state is detected (ST18: Yes). As a result, the load on the vehicle operator's hand in the one-hand gripping state due to the obstacle avoiding steering control can be reduced.

When the one-handed gripping state is detected, and the steering direction in the steering control and the comfortable steering direction for the hand gripping the steering wheel 21 coincide with each other (ST21: Yes), the control unit 15 executes steering control in step ST17 in such a manner that the limit value is set to a value (limit value=L2>L3) which is greater than the limit value for the case where the steering direction in the steering control and the comfortable steering direction for the hand gripping the steering wheel 21 do not coincide with each other (ST21: No). As a result, even when the one-hand gripping state is detected, a reliable avoidance of contact with an obstacle can be achieved while the load on the hand gripping the steering wheel 21 is prevented from becoming unduly great.

When the one-hand gripping state is not detected in step ST20, or when neither hand of the vehicle operator is gripping the steering wheel 21 (No), the control unit 15 sets a fourth limit value L4 as the limit value in the steering control (step ST25). In other words, the control unit 15 selects the limit mode involving the fourth limit value L4. The fourth limit value L4 is a value smaller than the third limit value L3 (L4<L3). The control unit 15 executes the steering control in the limit mode involving the fourth limit value L4 (step ST17), and the program flow advances to the processing of step ST12 before restarting the control process anew.

When the vehicle operator is gripping the steering wheel 21, the gripping force may act as a resistance for the steering motor 20 in turning the steering wheel 21 in the obstacle avoidance operation. Therefore, the control unit 15 executes the steering control in step ST17 such that the limit value is higher (limit value=L1 to L3>L4) when the both-hands gripping state or the one-hand gripping state is detected (ST18: Yes, ST20: Yes) than when the neither-hand gripping state is detected (ST20: No). As a result, contact of the vehicle 2 with the obstacle is more reliably avoided.

As described above, when executing the steering control in step ST17, the control unit 15 selects the limit mode in step ST19, step ST22, step ST23, and step ST25 according to the gripping state of the vehicle operator with respect to the steering wheel 21. Therefore, when it is determined in step ST3 of FIG. 3 that the driving operation assist is necessary (Yes), the control unit 15 assist the vehicle operator in avoiding the obstacle by executing the steering control so as to avoid a contact with the obstacle without causing any undue strain on the vehicle operator's hand.

In the limit mode selected in step ST19, step ST22, step ST23, or step ST25 described above, the control unit 15 limits the steering torque in the steering control. In other words, the limit mode is a control mode that limits the steering torque in the steering control. Thus, since the steering torque of the steering wheel 21 is limited when the steering control is being executed in the limit mode (ST17), the vehicle operator's hand gripping the steering wheel 21 is prevented from being twisted with a large steering torque.

When the one-handed gripping state is detected (ST20: Yes), the control unit 15 executes the notification control for the steering device 5 in step ST24 so as to prompt the vehicle operator via the steering wheel 21 to grip the steering wheel 21. As a result, the vehicle operator is intuitively caused to grip the steering wheel 21 in proper manner via the signal conveyed via the steering wheel 21.

As described above, the notification control includes a control action of causing the steering motor 20 to cyclically move the steering device 5 in clockwise and counter-clockwise directions with a predetermined amplitude so as to vibrate the steering wheel 21. Thus, the vibration of the steering wheel 21 caused by the vibration of the steering device 5 can prompt the vehicle operator to properly grip the steering wheel 21. The notification control for the steering device 5 may include not only vibration control for the steering device 5 but also a display control action such as lighting and/or blinking of an indicator lamp or an icon on a display device provided in the steering device 5.

In this notification control, as described above, the control unit 15 may cause the vibratory turning speed of the steering wheel in the same direction as the turning direction of the obstacle avoidance control to be greater than that in the opposite direction to the turning direction of the obstacle avoidance control. Thereby, the vehicle operator can be prompted to grip the steering wheel 21 and be informed of the turning direction of the steering wheel 21 of the obstacle avoidance control that is initiated.

The present invention has been described in terms of a specific embodiment, but the present invention can be modified in various ways without departing from the scope of the present invention.

For example, the control unit 15 limited the steering torque in the steering control in the limit mode selected in step ST18, step ST21, step ST22, or step ST24 in the foregoing embodiment, but alternatively, the control unit 15 may limit the steering speed in the steering control in the limit mode. By thus limiting the steering speed in executing the steering control in the limit mode (ST17), the vehicle operator's hand gripping the steering wheel 21 is prevented from being twisted at an unexpectedly high angular speed.

Alternatively, the control unit 15 may limit the steering angle δ in the steering control in the limit mode. By thus limiting the steering angle δ in executing the steering control in the limit mode (ST17), the vehicle operator's hand gripping the steering wheel 21 is prevented from being twisted by an unexpectedly large angular. In such a case, the limit value L4 which is typically adopted when neither hand of the vehicle operator is gripping the steering wheel 21 may be greater than L2 and L3 (L4>L2, L3), and may even be greater than L1 (L4>L1).

The specific configuration, arrangement, quantity, procedure, etc. of each member or part of the arrangement according to the present invention can be changed as appropriate without departing from the scope of the present invention. Also, it should be noted that various elements shown in the foregoing embodiment are not necessarily essential for the present invention, and can be appropriately modified or omitted without departing from the scope of the present invention.

The invention claimed is:

1. A vehicle contact avoidance assist system for providing assistance in avoiding an obstacle located ahead of or otherwise adjacent to an own vehicle, comprising:
a steering device including a steering actuator for steering a steerable wheel of the vehicle according to a steering input applied to a steering wheel of the vehicle;
an obstacle acquisition unit configured to acquire an obstacle located ahead of the vehicle;
a contact avoidance control unit configured to perform an obstacle avoidance operation upon detecting the obstacle located ahead of the vehicle by the obstacle acquisition unit, the obstacle avoidance operation including a steering of the steerable wheel via the steering actuator so as to avoid the obstacle;
a steering wheel gripping state detection unit configured to detect a gripping state of the steering wheel by a vehicle operator;
wherein the contact avoidance control unit is configured to apply a restriction on the obstacle avoidance operation depending on the detected gripping state,
wherein the gripping state includes a both-hands gripping state where the vehicle operator grips the steering wheel with both hands, and a one-hand gripping state where the vehicle operator grips the steering wheel with a single hand, the restriction applied by the contact avoidance control unit being of a higher level in the one-hand gripping state than in the both-hands gripping state,
wherein the one-hand gripping state includes a left-hand gripping state where the vehicle operator grips the steering wheel only with a left hand, and a right-hand gripping state where the vehicle operator grips the steering wheel only with a right hand, the restriction applied by the contact avoidance control unit in the left-hand gripping state being of a higher level when the steering wheel turns in a clockwise direction than when the steering wheel turns in a counter-clockwise direction, the restriction applied by the contact avoidance control unit in the right-hand gripping state being of a higher level when the steering wheel turns in the counter-clockwise direction than when the steering wheel turns in the clockwise direction.

2. The vehicle contact avoidance assist system according to claim 1, wherein the restriction includes limiting a steering torque of the steering actuator.

3. The vehicle contact avoidance assist system according to claim 1, wherein the restriction includes limiting a steering angular speed of the steering actuator.

4. The vehicle contact avoidance assist system according to claim 1, wherein the restriction includes limiting a steering angle of the steering actuator.

5. The vehicle contact avoidance assist system according to claim 1, wherein the gripping state includes a neither-hand gripping state where the vehicle operator grips the steering wheel with neither hand, the restriction applied by the contact avoidance control unit being of a higher level in the one-hand gripping state and the both-hands gripping state than in the neither-hand gripping state.

6. The vehicle contact avoidance assist system according to claim 1, wherein the contact avoidance control unit is configured to transmit a signal to the vehicle operator via the steering wheel when the one-hand gripping state is detected immediately before the obstacle avoidance operation is initiated and/or during execution of the obstacle avoidance operation.

7. The vehicle contact avoidance assist system according to claim 6, wherein the signal to be transmitted to the vehicle operator comprises a cyclic angular movement of the steering wheel.

8. A vehicle contact avoidance assist system for providing assistance in avoiding an obstacle located ahead of or otherwise adjacent to an own vehicle, comprising:
a steering device including a steering actuator for steering a steerable wheel of the vehicle according to a steering input applied to a steering wheel of the vehicle;
an obstacle acquisition unit configured to acquire an obstacle located ahead of the vehicle;
a contact avoidance control unit configured to perform an obstacle avoidance operation upon detecting the obstacle located ahead of the vehicle by the obstacle acquisition unit, the obstacle avoidance operation including a steering of the steerable wheel via the steering actuator so as to avoid the obstacle;
a steering wheel gripping state detection unit configured to detect a gripping state of the steering wheel by a vehicle operator;
wherein the contact avoidance control unit is configured to apply a restriction on the obstacle avoidance operation depending on the detected gripping state,
wherein the gripping state includes a both-hands gripping state where the vehicle operator grips the steering wheel with both hands, and a one-hand gripping state where the vehicle operator grips the steering wheel with a single hand, the restriction applied by the contact avoidance control unit being of a higher level in the one-hand gripping state than in the both-hands gripping state,
wherein the contact avoidance control unit is configured to transmit a signal to the vehicle operator via the steering wheel when the one-hand gripping state is detected immediately before the obstacle avoidance operation is initiated and/or during execution of the obstacle avoidance operation,
wherein the signal to be transmitted to the vehicle operator comprises a cyclic angular movement of the steering wheel, wherein the cyclic angular movement of the steering wheel is performed in such a manner that an angular speed of the steering wheel in a direction of a movement of the steerable wheel in avoiding the obstacle is greater than an angular speed of the steering wheel in an opposite direction.

* * * * *